(12) United States Patent
Schnoerch et al.

(10) Patent No.: US 11,387,549 B2
(45) Date of Patent: Jul. 12, 2022

(54) GLAZING PANEL HAVING AN ELECTRICALLY CONDUCTIVE CONNECTOR

(71) Applicants: AGC GLASS EUROPE, Louvain-la-Neuve (BE); AGC INC., Chiyoda Ku (JP)

(72) Inventors: Peter Schnoerch, Brussels (BE); Shoichi Takeuchi, Chiyoda Ku (JP)

(73) Assignees: AGC GLASS EUROPE, Louvain-la-Neuve (BE); AGC INC., Chiyoda Ku (JP)

( * ) Notice: Subject to any disclaimer, the term of this patent is extended or adjusted under 35 U.S.C. 154(b) by 45 days.

(21) Appl. No.: 16/640,981

(22) PCT Filed: Aug. 7, 2018

(86) PCT No.: PCT/EP2018/071370
§ 371 (c)(1),
(2) Date: Feb. 21, 2020

(87) PCT Pub. No.: WO2019/038075
PCT Pub. Date: Feb. 28, 2019

(65) Prior Publication Data
US 2021/0126354 A1 Apr. 29, 2021

(30) Foreign Application Priority Data
Aug. 25, 2017 (EP) .................................. 17187926

(51) Int. Cl.
*H01Q 1/32* (2006.01)
*H01Q 1/36* (2006.01)
(Continued)

(52) U.S. Cl.
CPC ......... *H01Q 1/364* (2013.01); *B60R 13/0846* (2013.01); *B60R 16/03* (2013.01);
(Continued)

(58) Field of Classification Search
None
See application file for complete search history.

(56) References Cited

U.S. PATENT DOCUMENTS 10,665,920 B2 * 5/2020 Sarkis .................... H01Q 1/325
2005/0245129 A1 * 11/2005 Sato ........................ H01R 24/40
439/578

(Continued)

FOREIGN PATENT DOCUMENTS

| EP | 2 634 861 A1 | 9/2013 |
|---|---|---|
| EP | 3 125 361 A1 | 2/2017 |
| JP | 2008-182523 A | 8/2008 |

OTHER PUBLICATIONS

International Search Report dated Aug. 29, 2018 in PCT/EP2018/071370 filed on Aug. 7, 2018, citing documents AA-AD and AO-AQ, 4 pages.

*Primary Examiner* — Trinh V Dinh
(74) *Attorney, Agent, or Firm* — Oblon, McClelland, Maier & Neustadt, L.L.P.

(57) ABSTRACT

A glazing panel comprising (i) a pane of glass, (ii) an antenna, (iii) an electrically conductive connector joined to the antenna by a solder material, and (iv) a coaxial cable joined to the electrically conductive connector. The electrically conductive connector is a flat connector comprising first and a second electrically conductive portions laminated between two films of a resilient material.

14 Claims, 2 Drawing Sheets

(51) Int. Cl.
*B60R 13/08* (2006.01)
*B60R 16/03* (2006.01)
*H01P 3/06* (2006.01)
*H01Q 1/12* (2006.01)
*H01Q 1/38* (2006.01)

(52) U.S. Cl.
CPC ............. *H01P 3/06* (2013.01); *H01Q 1/1271* (2013.01); *H01Q 1/38* (2013.01)

(56) References Cited

U.S. PATENT DOCUMENTS

| | | |
|---|---|---|
| 2008/0180332 A1 | 7/2008 | Noro et al. |
| 2011/0121924 A1 | 5/2011 | White et al. |
| 2015/0311605 A1 | 10/2015 | Moore |
| 2017/0033432 A1 | 2/2017 | Gok et al. |
| 2018/0138575 A1* | 5/2018 | Sarkis ................. H01R 9/0515 |

* cited by examiner

GLAZING PANEL HAVING AN ELECTRICALLY CONDUCTIVE CONNECTOR

The present invention relates to glazing panel, which comprises connector, in particular electrically conductive connector. More particularly, the present invention relates to a vehicle glazing, which comprises electrically conductive connector connected to an antenna, for example a coaxial cable connected to an antenna by an electrically conductive connector.

Glazing panels in motor vehicles today have a number of additional electrical devices such as an antenna, glazing panel heater, and the like.

Through the introduction of an electrically functional component or an electrically functional layer coupled with a glazing panel, automotive glazing can be provided with various functions. The electrically functional components are, for example, antenna elements, solar cells or electrochromic coatings. Through insertion of thin metal wires or application of an electrically heatable coating, a heating function can be obtained. These electrically functional component or layer need to be connected for example to a power source or to an amplifier thanks to at least an electrically conductive connector. The electrical connectors are attached before the glazing panel is installed in the motor vehicle.

The attachment to a glazing panel occurs in that an electrically conductive connector provided with solder material is placed on the contact surface of the glazing panel and is then heated so that the solder material melts with the contact surface of the glazing panel.

Traditionally, the connectors are soldered to an electrically functional component or an electrically functional layer with a lead-based solder material because lead is a deformable metal and minimizes mechanical stress between the connector and the substrate due to difference of thermal expansion of the connector and the substrate resulting from changes in temperature. More specifically, differences in coefficients of thermal expansion between the connectors, which are typically made of a good conductive material such as copper, and the substrates cause the mechanical stress. In case of a glass substrate, such stress may result in cracking or other damage to the substrate, which is typically made of glass. Lead-based solder material, typically comprises tin (Sn) and lead (Pb). The lead decreases the radical reaction rate between tin in the solder and the electrically functional component or the electrically functional layer, generally consisting of a high silver (Ag) content, allowing for good solderability. Today, it is known that lead may be considered an environmental contaminant. Thus, there is a motivation in many industries, particularly the automotive industry, to move away from all uses of lead in vehicles. On top of that, the EU legislation, e.g. the current "End of Life" Vehicle Directive (ELV Directive) 2000/53/EC prohibits certain hazardous substances such as lead. The main impetus for the industry to leave lead behind is a ban on lead in electronics imposed by the European Union. Under the Restriction of Hazardous Substances directive, as of 1 Jul. 2006 lead must be replaced by other substances in electronic equipment. (The directive also bans mercury, cadmium, and hexavalent chromium.) Any electronic components bound for Europe are subject to the ban.

The use of lead-free solder materials is common in the microelectronics and plumbing industries. Such materials are for example described in EP0704727B1 and U.S. Pat. No. 4,758,407B which are representative patents from each of these respective industries.

The use of lead-free solder materials is expanding into other industries, including the automotive industry. Such use is for example described in US publication US20070224842A1.

Conventional solder materials have been proposed to replace the lead in the solder material. Such materials comprise commonly a high level of tin, along with small amounts of silver, copper, indium and bismuth. However, such materials increase radical reaction rates between the tin-rich solder material and the silver of or added to the electrically functional component or the electrically functional layer, resulting in poor solderability. These conventional materials do not absorb the mechanical stress between the connector and the substrate due to thermal expansion of the connector and the substrate resulting from changes in temperature, which tends to crack or otherwise damage the substrate. Further, many alternative materials for the connector are difficult to solder, making it difficult to sufficiently adhere the connector to the electrically functional component or the electrically functional layer such as antenna on the substrate. As a result, other techniques would be required in order to sufficiently adhere the alternative materials to the electrically functional component or the electrically functional layer such as antenna on the substrate.

For example, U.S. Pat. No. 6,253,988 discloses solder material compositions including high amounts (or large amounts) of indium due to a low melting point, malleability, and good solderability to the electrically functional component or the electrically functional layer. However, solder material compositions including indium may have very soft phases, and the solder material compositions exhibit poor cohesive strength under stress. Because these other conventional materials are insufficient, there is a need, particularly, to find an electrically conductive connector soldered with a lead-free solder material.

The present invention relates to a glazing panel more particularly a vehicle glazing comprising an electrically functional component or an electrically functional layer linked through an electrically conductive connector. A such electrically functional component or electrically functional layer is for example an antenna.

An antenna is an electrical device which converts electric power into radio waves, and vice versa. It is usually used with a radio transmitter or radio receiver. In transmission, a radio transmitter supplies an electric current oscillating at radio frequency (i.e. a high frequency alternating current (AC)) to the antenna's terminals, and the antenna radiates the energy from the current as electromagnetic waves (radio waves). In reception, an antenna intercepts some of the power of an electromagnetic wave in order to produce a tiny voltage at its terminals that is applied to a receiver to be amplified.

Antennas are essential components of all equipment that uses radio. They are used in systems such as radio broadcasting, broadcast television, two-way radio, communications receivers, radar, cell phones, and satellite communications, as well as other devices such as garage door openers, wireless microphones, Bluetooth-enabled devices, wireless computer networks, baby monitors, and RFID tags on merchandise.

Typically, an antenna consists of an arrangement of metallic conductors, electrically connected (often through a transmission line) to the receiver or transmitter. An oscillating current of electrons forced through the antenna by a transmitter will create an oscillating magnetic field around the antenna elements, while the charge of the electrons also creates an oscillating electric field along the elements.

In the automotive field, antennas are used to send and/or to receive information such as radio, TV or cell phone signals (GSM) but also to communicate with the vehicle, i.e. to be able to open car doors without having to insert the key, with other vehicles, i.e. to keep a distance between to vehicle, or with the environment, i.e. tolls, traffic lights, . . . .

Antennas may be assembled within the glazing, i.e. windshield, backlite, sidelite or sunroof or fixed in the carbody, such as roof. There are different antenna systems used in a vehicle.

The antenna size is usually fraction of the wave length ($\lambda$) of its operating frequency, typically $\lambda/2$ or $\lambda/4$. Additionally, the presence of neighbor dielectric medium reduces the dimension of the radiator by a factor of $\sqrt{\epsilon_r}$ where $\epsilon_r$ is the relative permittivity of dielectric material.

Modern cars may contain multiple antennas for analog audio broadcasts (amplitude modulated (AM—0.5-1.7 MHz) and frequency modulated (FM—76-108 MHz), global positioning system (GPS—1575 MHz) data, cellular phone communication, e.g. global system for communication (GSM—800/1800 MHz), long term evolution (LTE—800/1800/2600 MHz), digital audio broadcasting (DAB—170-240 MHz), remote keyless entry (RKE—315/433 MHz), television reception, tire pressure monitor system (TPMS—315/433 MHz), automotive radar (22-26 GHz/76-77 GHz), car to car communication (C2C—5.9 GHz), etc.

A first system is well-known and described in U.S. Pat. No. 8,519,897B2. Low-profile antenna assembly or Shark fin type car antenna assembly, are configured for using with AM/FM radio, satellite digital audio radio services (SDARS), global positioning systems (GPS), digital audio broadcasting (DAB)-VHF-III, DAB-L, Wi-Fi, Wi-Max, and cell phones. In some example embodiments, the antenna assemblies include at least two antennas co-located, for example, on common chassis of the antenna assemblies, under common covers of the antenna assemblies. Such antennas are commonly placed on roofs, hoods, or trunks of automobiles to help to ensure that the antennas have unobstructed views overhead or toward the zenith.

A second well-known system is backlite antenna system utilizing defogger elements already encapsulated in the back window of the vehicle as antenna elements to receive the AM and FM broadcasts. Examples of such backlite antenna systems can be found in U.S. Pat. No. 5,293,173 or in U.S. Pat. No. 5,099,250. For the known combination defogger/antenna element systems embedded in rear windows of vehicles, it has been necessary to incorporate two bifilar or toroidal chokes between the elements and the vehicle DC power supply so as to separate the antenna signals from the high current signals that heat the elements.

A third system is well-known and described in US publication US2014104122A1. This system consists of a window assembly with an antenna element including wire or transparent coating disposed within the glazing. This type of antennas is generally configured to receive linearly polarized radio frequency (RF) signals. Specifically, the linearly polarized RF signals which the antenna element may receive, in a non-limiting manner, AM, FM, RKE, DAB, DTV and cell phone signals.

With the evolution of technologies, vehicles are equipped with a lot of antennas to be able to communicate (receiving or emitting information). Some are fixed on the carbody, others are placed on the glazing panels of glass.

Classical automotive broadcast low frequency antennas placed on glass (the second or the third type of antennas) are electrically fed, powered and connected by a single element as described in the PCT publication WO2004068643.

Classically, this element is physically and electrically connected to the antenna by a single crimp soldered within an area of silver print. For example, a 10 mm by 10 mm silver print area is printed on a backlite and is linked to a wire antenna. The element could be a wire, a pigtail, a copper line or a MQS flat cable connected to an active amplifier.

The soldering of this type of antennas is not critical as long as it fits inside, the said predefined area and has no impact on the functionality and performance of these low frequency antennas since it is a small fraction of their wavelength.

In the case of higher frequency systems, so with much shorter wavelength, two problems appear.

The first problem is due to the single wire. A single wire is not suitable to transmit the signal and to receive the signal. For efficient signal transmission at higher frequencies, a coaxial cable is needed. The said coaxial cable corresponds to an assembly comprising a central metallic thin wire or central conductor, coming through, inside a cylindrical dielectric plastic material, that is also covered by a cylindrical metallic shield, metallic grid as a ground plane. This assembly is covered finally by an insulating jacket preferably a plastic jacket.

Generally, antenna for these high frequencies comprises at least two parts which are connected to the coaxial cable. The metallic shield of the coaxial cable is connected to the first part of the antenna (for example the ground) and the central conductor is connected to the second part of the antenna in such a way to receive or transmit an electrical potential difference, voltage between these two parts of the antenna.

The second problem is due to the soldering. Antennas at higher frequency have shorter wavelength. So the precision of the soldering at higher frequency is or may be strict since even small fluctuations are still comparable to the wavelength.

For these reasons, high frequency antennas need to be connected to a specific cable such as a coaxial cable. This coaxial cable needs to be connected on one hand to the ground of the antenna and on the other hand to the second part of the antenna. For that, the cable is connected to the antenna via a connector that connects the metallic shield of the coaxial cable to the ground of the antenna and also allows the central conductor to be connected to the other part of the antenna.

It is known form the prior art to use an electrically conductive connector comprising at least two mechanical fixing elements for maintaining the coaxial cable to the electrically conductive connector. However, this kind of connector presents some inconvenient such as an important spatial crowding and can not be used for example in laminated glasses. In the comparison with the previous metallic connector, the metallic connector has two metallic parts and each part has to crimp the coaxial cable precisely to keep the distance between each part in order to maintain the electrical stability in high frequency. Each part made of metal has to be made with precision and has a large height. In the case of metallic connector, in order to maintain high frequency performances, a shield extension is applied on the coaxial cable. Then, another shrinking tube and additional process are needed.

The following description relates to an automotive glazing however it is understood that the invention may be applicable to others fields like architectural glazing which may provide electrically functional component or an electrically functional layer coupled with a pane of glass.

The invention relates to a glazing panel comprising:
a pane of glass,
an antenna,
an electrically conductive connector joined to the antenna by a solder material, and
a coaxial cable which comprises at least a center conductor and a shield separated by a dielectric element and protected by an insulated jacket.

According to the invention, the electrically conductive connector is a flat connector comprising a first electrically conductive portion on which the center conductor is provided and a second electrically conductive portion separated from the first electrically conductive portion on which the shield is provided, the electrically conductive portions are laminated between 2 films of resilient material and the solder material to join the antenna to electrically conductive connector material on the electrically conductive portion is provided in a zone free of resilient material.

More particularly, the invention relates to a vehicle glazing panel which comprises a pane of glass, an electrically conductive connector connected to an antenna, for example a coaxial cable connected to an antenna by an electrically conductive connector.

The pane of glass can be a flat or curved panel to fit with the design of the car. The pane of glass can be tempered or laminated to respect with the specifications of security. A heatable system, for example a coating or a network of wires or silver print on a pane of glass, can be applied on the pane of glass to add a defrosting function for example. Also, the pane of glass can be a clear glass or a colored glass, tinted with a specific composition of the glass or by applying a coating or a plastic layer for example.

According to the invention, a glazing panel comprises at least an antenna that is, preferably, a wideband antenna to receive and/or transmit information through a higher frequencies, for example a LTE network (4G). The antenna is preferably a printed antenna. The wideband antenna is, preferably, working with a frequency band between 700 MHz and 6 GHz and more preferably between 700 MHz and 3 GHz According to the invention, the glazing panel may comprise some other antennas like AM, FM, RKE, DAB, DTV antennas or other type of antennas to add antenna functions to the glazing panel.

According to the invention, the coaxial cable is a cable designed to allow carrying higher frequency signals better than a cable used for automotive antenna placed on a glass and comprises at least a center conductor and a shield separated by a dielectric element and protected by an insulated jacket.

According to one embodiment of the present invention, the electrically conductive connector connects an antenna to the cable and is joined to the antenna by a lead-free soldering to respect the recent EU regulation.

The electrically conductive connector material is a material selected to have difference of thermal expansion of the glazing panel and the electrically conductive connector material preferably less than $5 \times 10-6/° C$.

According to an embodiment of the present invention, the first and second portions of the electrically conductive connector may be provided with holes or bumps.

According to one embodiment of the invention, the resilient material laminating the first and the second electrically conductive portion is made of a plastic material as such polyimide film. Such as polyimide film has resilient for soldering heat and is flexible.

However, other heat resilient films such as Liquid Crystal Polymer film (LCP), Cyclo-olefin Polymer (COP) and Fluorine-based film may be used. According to one embodiment of the present invention, the first and the second electrically conductive portions comprise at least one material amongst copper, chromium-stainless, iron-nickel material. Thus, the first and the second electrically conductive portions may be made of different type of materials such as Copper, Chromium alloys, Steel alloys such stainless steel alloys, steel alloys with a high amount of Chromium or Nickel or any other materials or alloys that fit with constraints of the connector functions such as to be connected to an antenna, to be able to fix a cable, and other advantages of this kind of materials or alloys.

Preferably, a lead-free solder material is used to connect the electrically conductive connector to the antenna. Such solder material has improved characteristics at temperature greater than 150° C. Such solder material is known from DE102006047764A1. A such lead-free solder material is based on a solder alloy of Sn, Ag, comprising between 88% and 98.5% Sn by weight, between 0.5 and 5% Ag by weight or Bismuth-Tin-Silver (Bi—Sn—Ag) alloys. Preferably, the soldering material has the following alloys, at least as components thereof $Bi_xSn_yAg_z$ where x, y, z represents the percentage by weight of the component (this nomenclature is well-known): Bi57Sn42Ag0, Bi57Sn40Ag3, SnAg3.8Cu0.7, Sn55Bi44Ag1, or SAC alloys (Tin-Silver-Copper (Sn—Ag—Cu) alloys). More preferably, the solder alloy is a SAC305, consisting of 3% Ag by weight, 0.5% Cu by weight and 96.5% Sn by weight. This solder material improved bonding characteristics for the connectors used therewith, as well as high fatigue strength.

According to an embodiment of the invention, the first and the second electrically conductive layers may consist of a copper, an iron-nickel (FeNi) or iron-chromium (FeCr) alloy, or a mixture thereof. The connector element may consists of FeCr10, FeCr16, a Grade 430, FeNi42, FeNi48 or FeNi52.

Preferably, the first and the second electrically conductive portions are made of copper.

Due to the high frequency used, the connection between the antenna and the cable has to be very precise to limit the distortion of the signal. In order to fulfill this condition, the connector comprises two electrically conductive portions.

The soldering of the coaxial cable to the flat electrically conductive connector allow to maintain the cable in the right place avoiding movements of the cable and ensure having a good electrical connection to the antenna.

The present invention will now be more particularly described with reference to drawings and exemplary embodiments, which are provided by way of illustration and not of limitation. The drawings are a schematic representation and not true to scale. The drawings do not restrict the invention in any way. More advantages will be explained with examples.

Figure 1:
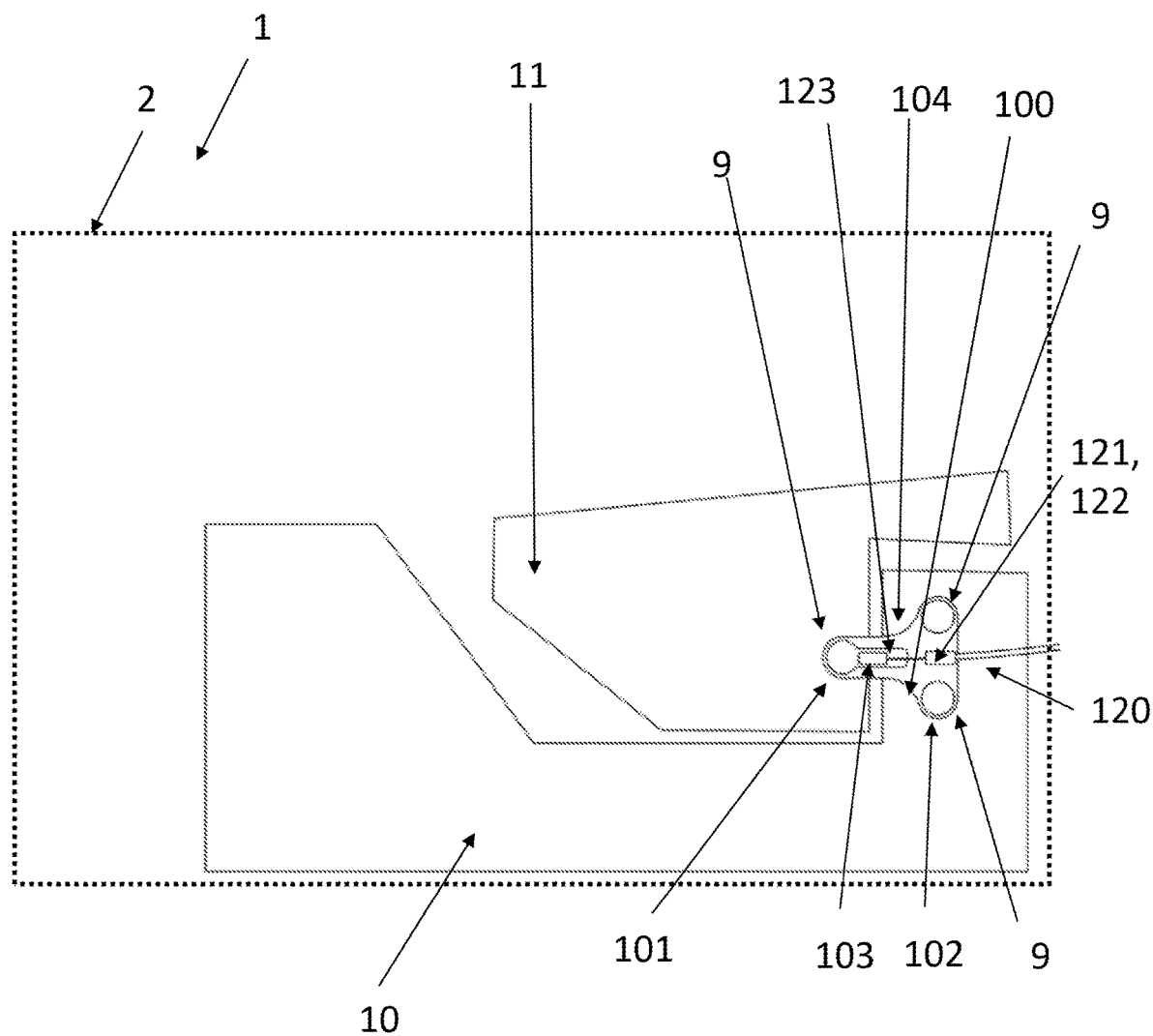
FIG. 1 is a plan view of an embodiment of the glazing panel comprising an electrically conductive connector according to the invention.
Figure 2:
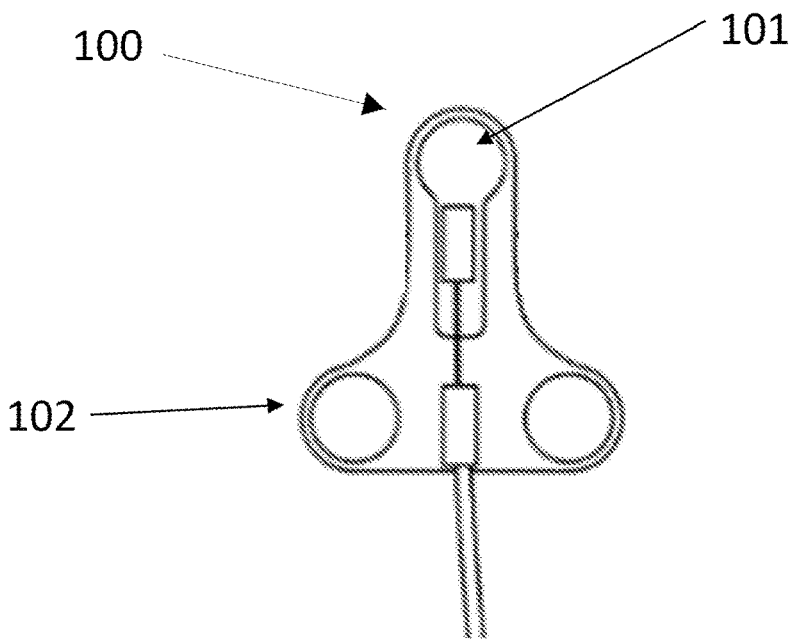
FIG. 2 is a plan view of an example of an electrically conductive connector according to the invention.
Figure 3:
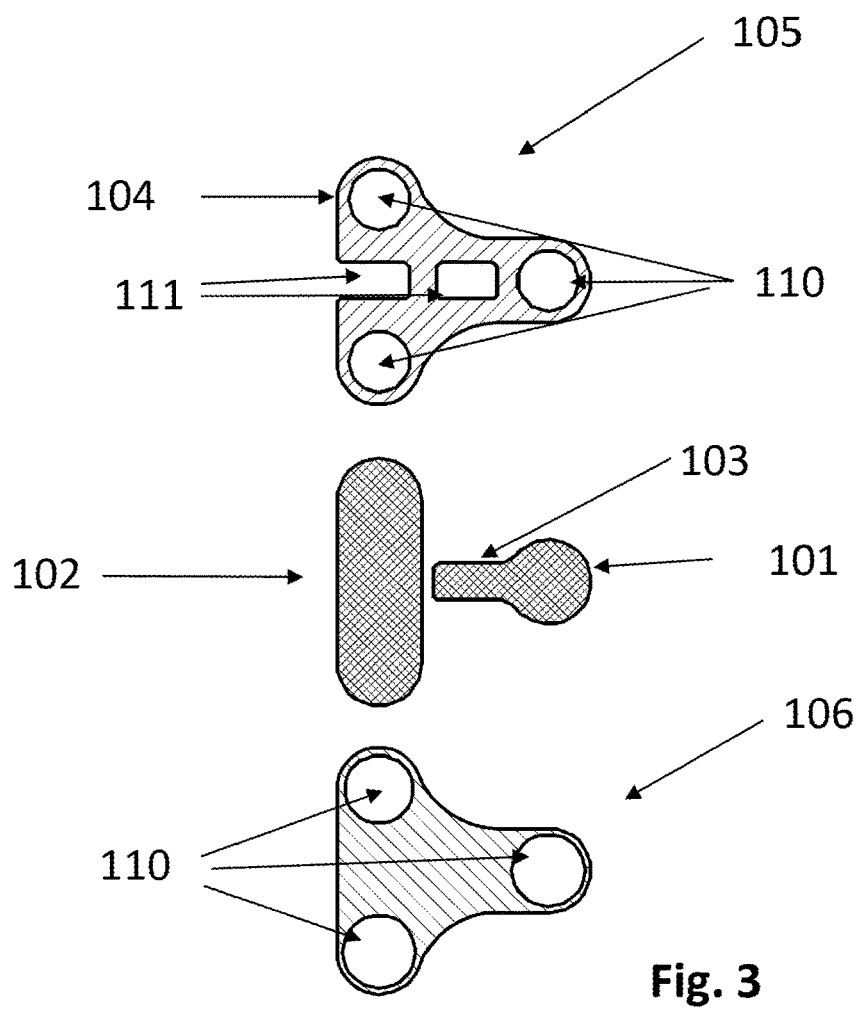
FIG. 3 is an exploded view of an example of an electrically conductive connector as shown in FIG. 2.

Referring to the FIG. 1 to FIG. 3 according to an embodiment of this invention, a glazing panel 1 carries a printed wideband antenna 10, 11 and an electrically conductive connector according to the present invention The electrically conductive connector 100 comprises a first and a second electrically conductive portions 101, 102. The first electrically conductive portion 101 comprises an extended region 103 which is electrically connected to a first part of the antenna 10 through a soldering material 9. The center conductor 123 of the coaxial cable is fixed to the first electrically conductive portion 101 through its extended region 103. The first and second conductive portions 101 and 102 are laminated between two films 105 and 106 also called respectively the upper film 105 and the bottom film 106 of a resilient material 104 as shown in FIGS. 2 and 3. As shown in FIG. 3, the bottom film 106 of resilient material 104 is provided with apertures (free zones of resilient material) 110 to leave free/accessible at least a part of the first and second conductive portions 101 and 102 to be connected to the coaxial cable 120. On at least a part of the first and second conductive portions 101 and 102 is provided a layer of solder material 9 on the face of the connector 100 intended to be in contact with the glazing 1. Preferably, the solder material is a lead free solder material as described previously. However, the other suitable solder material may be used. The upper film 105 of the resilient material 104 is provided with apertures 110 as for the bottom film 105 to leave free/accessible at least a part of the first (bottom) and second conductive portions 101 and 102 to be connected to the coaxial cable 120 and also with apertures 111 to fix the coaxial cable (center conductor 123 and the shield 122). According to the invention, the first and second conductive portions 101 and 102 are laminated between the bottom and upper films 105 and 106 of the resilient material 104.

A resilient material 104 according to the invention is for example made of polyimide plastic.

For example, the first and a second electrically conductive portions are made of copper and the soldering material 9 is a lead-free solder material such as SAC305 material. It is understood that the solder material may be any suitable material to solder the electrically conductive connector to glass.

The coaxial cable 120, comprising a center conductor 123 and a shield 122 protected by an insulated jacket 121 which surrounds the coaxial cable and may be a plastic material, is fixed by soldering to the first and second electrically conductive portions 101 and 102. In. This fixation of the cable to the electrically conductor 100 handles most of all the tension and provided rigidity needed. The center conductor 123 is fixed to the first and second electrically portions 101 and 102 by preferably soldering. Preferably, the center conductor 123 is fixed on an extended region 103 of the first electrically conductive portion 101. The solder material, preferably a lead-free solder material 9 is provided on the first and second electrically conductive portions 101 and 102.

The shield 122 of the connector is linked to the connector too through the second electrically conductive portion 102. The central conductor 123 of the coaxial cable 120 may be soldered to the electrically conductive portions.

By using a flat electrically conductive connector according to the present invention, the coaxial cable 120 fixed to the downside area of the extended region 103 in order to stay as close as possible to the glass to allow the soldering of the central conductor 123 with a minimum bending of the central line. Thus, a better repeatability of the soldering with the same position, precision, electrical, performance is obtained. Otherwise, the curvature of the central conductor will change the coaxial design and add losses and inefficient transmission modes.

The coaxial cable 120 fixed to the downside may be in direct contact or not with the surface of the pane of glass. However for industrial reasons, preferably a minimum distance between the coaxial cable and the surface of the pane of glass is in order to avoid any possible stress point at the glass after soldering and to limit the curvature of the central conductor.

The invention claimed is:

1. A glazing panel comprising:
a pane of glass,
an antenna,
an electrically conductive connector joined to the antenna by a solder material, and
a coaxial cable which comprises at least a center conductor and a shield separated by a dielectric element and protected by an insulated jacket,
wherein the electrically conductive connector is a flat connector comprising a first electrically conductive portion on which the center conductor is provided and a second electrically conductive portion separated from the first electrically conductive portion on which the shield is provided,
wherein the electrically conductive portions are laminated between 2 films of resilient material and the solder material to join the antenna to the electrically conductive connector, and
wherein the electrically conductive portions are provided in a zone free of resilient material.

2. The glazing panel according to claim 1, wherein the resilient material of the connector is made at least in part of polyimide film.

3. The glazing panel according to claim 1, wherein the first and the second electrically conductive portions comprise at least one material selected from the group consisting of copper, chromium-stainless, and iron-nickel material.

4. The glazing panel according to claim 3, wherein the first and the second electrically conductive portions are made of copper.

5. The glazing panel according to claim 1, wherein the first electrically conductive portion has an extended part on which the center conductor of the coaxial cable is fixed.

6. The glazing panel according to claim 1, wherein the electrically conductive connector is joined to the antenna by a lead-free solder material.

7. The glazing panel according to claim 1, wherein the antenna is a wideband printed antenna.

8. The glazing panel according to claim 1, wherein one of the films of resilient material is provided with apertures which define zones free of resilient material so that at least a part of the first and second conductive portions are electrically connected to the coaxial cable by the solder material in the zones free of resilient material.

9. The glazing panel according to claim 1, wherein at least one of the 2 films of resilient material is provided with apertures which define zones free of resilient material.

10. A glazing panel comprising:
a pane of glass,
an antenna printed on the pane of glass,
a first resilient film above the antenna,
a flat electrically conductive connector above the first resilient film, the flat electrically conductive connector joined to the antenna by a solder material,
a second resilient film above the flat electrically conductive connector, and
a coaxial cable comprising a center conductor and a shield separated by a dielectric element and protected by an insulated jacket, wherein the flat electrically conductive connector comprises a first electrically conductive portion electrically connected to the center conductor and a second electrically conductive portion separated from the first electrically conductive portion that is electrically connected to the shield, wherein the electrically conductive portions are laminated between the first and second resilient films and connected by solder material to join the antenna to the electrically conductive connector, and wherein the electrically conductive portions extend over a region free of material from the first resilient film.

11. The glazing panel according to claim 10, wherein the first and second resilient films are made at least in part of polyimide film.

12. The glazing panel according to claim 10, wherein the first and the second electrically conductive portions comprise at least one material selected from the group consisting of copper, chromium-stainless, and iron-nickel material.

13. The glazing panel according to claim 10, wherein the first resilient film is provided with apertures which define zones free of resilient material so that at least a part of the first and second conductive portions may be electrically connected to the coaxial cable by the solder material in the zones free of resilient material.

14. The glazing panel according to claim 10, wherein at least one of the first and second resilient films is provided with apertures which define zones free of resilient material.

* * * * *